(12) United States Patent
El-Dasher et al.

(10) Patent No.: US 12,128,611 B2
(45) Date of Patent: *Oct. 29, 2024

(54) SYSTEM AND METHOD FOR HIGH POWER DIODE BASED ADDITIVE MANUFACTURING

(71) Applicant: Lawrence Livermore National Security, LLC, Livermore, CA (US)

(72) Inventors: Bassem S. El-Dasher, Livermore, CA (US); Andrew J. Bayramian, Marblehead, MA (US); James A. Demuth, Woburn, MA (US); Joseph C. Farmer, Tracy, CA (US); Sharon G. Torres, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,741

(22) Filed: Oct. 20, 2022

(65) Prior Publication Data

US 2023/0123528 A1 Apr. 20, 2023

Related U.S. Application Data

(60) Division of application No. 16/728,929, filed on Dec. 27, 2019, now Pat. No. 11,534,865, which is a
(Continued)

(51) Int. Cl.
*B29C 64/153* (2017.01)
*B22F 10/20* (2021.01)
(Continued)

(52) U.S. Cl.
CPC ............ *B29C 64/153* (2017.08); *B22F 10/20* (2021.01); *B22F 10/28* (2021.01); *B22F 10/36* (2021.01);
(Continued)

(58) Field of Classification Search
CPC ...... B23K 26/066; B29C 64/153; B33Y 50/02
See application file for complete search history.

(56) References Cited

U.S. PATENT DOCUMENTS

| 4,247,508 A | 1/1981 | Housholder |
| 4,944,817 A | 7/1990 | Bourell et al. |
| (Continued) | | |

FOREIGN PATENT DOCUMENTS

| JP | 03258480 B2 | 11/1991 |
| JP | H071593 A | 1/1995 |
| (Continued) | | |

OTHER PUBLICATIONS

Decision of Refusal issued by Japan Patent Office in corresponding Japanese Patent Application No. 2015-561587, dated Feb. 15, 2018, 11 pages.
(Continued)

*Primary Examiner* — James Sanders
(74) *Attorney, Agent, or Firm* — HARNESS, DICKEY & PIERCE, P.L.C.

(57) ABSTRACT

The present disclosure relates to a system for performing an Additive Manufacturing (AM) fabrication process on a powdered material, deposited as a powder bed and forming a substrate. The system makes use of a laser for generating a laser beam, and an optical subsystem. The optical subsystem is configured to receive the laser beam and to generate an optical signal comprised of electromagnetic radiation sufficient to melt or sinter the powdered material. The optical subsystem uses a digitally controlled mask configured to pattern the optical signal as needed to melt select portions of a layer of the powdered material to form a layer of a 3D part. A power supply and at least one processor are also included for generating a plurality of different power density levels selectable based on a specific material composition, absorptivity and diameter of the powder particles,
(Continued)

and a known thickness of the powder bed. The powdered material is used to form the 3D part in a sequential layer-by-layer process.

14 Claims, 4 Drawing Sheets

Related U.S. Application Data division of application No. 15/145,402, filed on May 3, 2016, now Pat. No. 10,569,363, which is a continuation of application No. 14/988,190, filed on Jan. 5, 2016, now Pat. No. 9,855,625, which is a division of application No. 13/785,484, filed on Mar. 5, 2013, now Pat. No. 9,308,583.

(51) Int. Cl.

| | | |
|---|---|---|
| *B22F 10/28* | (2021.01) | |
| *B22F 10/36* | (2021.01) | |
| *B22F 12/43* | (2021.01) | |
| *B22F 12/44* | (2021.01) | |
| *B23K 26/042* | (2014.01) | |
| *B23K 26/06* | (2014.01) | |
| *B23K 26/0622* | (2014.01) | |
| *B23K 26/066* | (2014.01) | |
| *B23K 26/144* | (2014.01) | |
| *B23K 26/342* | (2014.01) | |
| *B33Y 30/00* | (2015.01) | |
| *B33Y 80/00* | (2015.01) | |
| *B22F 10/30* | (2021.01) | |
| *B22F 12/55* | (2021.01) | |
| *B33Y 50/02* | (2015.01) | |
| *C22C 32/00* | (2006.01) | |

(52) U.S. Cl.
CPC .............. *B22F 12/43* (2021.01); *B22F 12/44* (2021.01); *B23K 26/042* (2015.10); *B23K 26/0622* (2015.10); *B23K 26/0643* (2013.01); *B23K 26/066* (2015.10); *B23K 26/144* (2015.10); *B23K 26/342* (2015.10); *B33Y 30/00* (2014.12); *B33Y 80/00* (2014.12); *B22F 10/30* (2021.01); *B22F 12/55* (2021.01); *B33Y 50/02* (2014.12); *C22C 32/0026* (2013.01); *Y02P 10/25* (2015.11)

(56) References Cited

U.S. PATENT DOCUMENTS

| | | |
|---|---|---|
| 5,236,637 A | 8/1993 | Hull |
| 5,314,003 A | 5/1994 | Mackay |
| 5,382,308 A | 1/1995 | Bourell et al. |
| 5,393,482 A | 2/1995 | Benda et al. |
| 5,640,667 A | 6/1997 | Freitag et al. |
| 5,674,414 A | 10/1997 | Schweizer |
| 6,054,192 A | 4/2000 | Otsuka et al. |
| 6,215,093 B1 | 4/2001 | Meiners et al. |
| 7,088,432 B2 | 8/2006 | Zhang |
| 9,107,434 B2 | 8/2015 | Singh |
| 9,308,583 B2 | 4/2016 | El-Dasher et al. |
| 2002/0093115 A1 | 7/2002 | Jang et al. |
| 2004/0200812 A1 | 10/2004 | Grewell et al. |
| 2005/0083498 A1 | 4/2005 | Jeng et al. |
| 2009/0020901 A1 | 1/2009 | Schillen et al. |
| 2010/0140849 A1 | 6/2010 | Comb et al. |
| 2010/0176539 A1 | 7/2010 | Higashi et al. |
| 2010/0323301 A1 | 12/2010 | Tang |
| 2011/0019705 A1 | 1/2011 | Adams et al. |
| 2011/0033887 A1 | 2/2011 | Fang et al. |
| 2011/0190904 A1 | 8/2011 | Lechmann et al. |
| 2013/0001834 A1 | 1/2013 | El-Siblani et al. |
| 2013/0004680 A1 | 1/2013 | Godfrey et al. |
| 2013/0095603 A1 | 4/2013 | Cabal |
| 2013/0136868 A1 | 5/2013 | Bruck et al. |
| 2014/0361463 A1 | 12/2014 | DeSimone et al. |
| 2015/0048075 A1 | 2/2015 | Pedrosa et al. |

FOREIGN PATENT DOCUMENTS

| | | |
|---|---|---|
| JP | 2001-504897 A | 4/2001 |
| JP | 2001137685 A | 5/2001 |
| JP | 2004306606 A | 11/2004 |
| JP | 2011504819 A | 2/2011 |
| JP | 2012145613 A | 8/2012 |
| WO | WO-201111029 A1 | 9/2011 |
| WO | WO-2012125118 A1 | 9/2012 |
| WO | WO-2013024297 A1 | 2/2013 |

OTHER PUBLICATIONS

Extended European Search Report dated Oct. 24, 2016, corresponding to EP Application No. 14760359.1, 9 pages.
First Office Action issued in corresponding Japanese Patent Application No. 2015-561587 mailed Oct. 31, 2017, 9 pages.
Helbert, John N. "Handbook of VLSI microlithography," 2d Ed., Hoyes Publications, New York, NY (2001), 11 pp.
Notice of Last Non-Final Rejection (With English Translation) for Korean Application No. 10-2015-7027184, mailed Apr. 25, 2021.
Tolochko, N. K., et al. "Absorptance of power materials suitable for laser sintering," Rapid Prototyping Journal, vol. 6, No. 3 (2000), pp. 155-160.

| Material | Avg. Power Flux Required $\left[\frac{W}{cm^2}\right]$ |
|---|---|
| Al | 12 |
| Fe | 170 |
| Ti | 220 |
| W | 2,900 |

Assumptions:
- Solid Emissivity of 0.3
- Molten Emissivity of 0.1
- 1cm Thick Base Plate with Outer Edge Held at 25C
- Environment at 25C
- 30um Diameter Powder in a 90um Thick Powder Layer

SYSTEM AND METHOD FOR HIGH POWER DIODE BASED ADDITIVE MANUFACTURING

CROSS-REFERENCE TO RELATED APPLICATIONS

This application is a divisional of U.S. patent application Ser. No. 16/728,929, filed Dec. 27, 2019; which is a divisional of U.S. patent application Ser. No. 15/145,402, filed May 3, 2016 (now U.S. Pat. No. 10,569,363), which is a continuation of U.S. patent application Ser. No. 14/988,190, filed Jan. 5, 2016 (now U.S. Pat. No. 9,855,625); which is a divisional of U.S. patent application Ser. No. 13/785,484, filed on Mar. 5, 2013 (now U.S. Pat. No. 9,308,583). This application claims the benefit and priority of each of the above applications, and the disclosures of all of the above applications are incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to Additive Manufacturing systems and techniques for making three dimensional articles and parts, and more particularly to a system and method for performing Additive Manufacturing using a high power diode system.

BACKGROUND

The statements in this section merely provide background information related to the present disclosure and may not constitute prior art.

Additive Manufacturing ("AM"), also referred to as 3D printing, is a manufacturing technique in which material is added sequentially, layer by layer, in order to build a part. This is in contrast to traditional machining, where the part starts as a block of material that is then whittled down to the final desired shape. With AM fabrication, a directed power source is used to agglomerate material (typically powder) into a final, near net-shape article. Three dimensional articles are manufactured one layer at a time as an assemblage of two-dimensional sections. One important advantage of AM fabrication is that complex shapes (e.g., parts with internal features) can be realized. Another important advantage is that the material required is limited to that used to form the final part. Thus, AM fabrication has the benefit of very little material loss. This is especially important for expensive/tightly controlled materials.

The use of AM for metal fabrication is relatively recent. Historically, plastics have been the focus of commercial systems that employ AM. Nevertheless, the use of metals with AM is highly commercially and technologically important because the majority of engineered structures rely heavily on metals. Metal AM requires a relatively high power, highly focused laser beam (typically on the order of 100 W-1000 W) to melt, fuse, and/or sinter metallic powder. The metal powder is typically placed in a powder bed during the AM process. The laser beam is rastered along the powder surface to make a two-dimensional section per pass. Once each layer is completed, the powder bed retracts and new powder is layered on top of the just-completed layer. Considering that a typical layer thickness is only about 50-100 microns, it can be seen how this rastering is the most time-consuming step. This is the principal reason why objects that would only take two to three hours to machine using traditional machining methods may take up to eight hours or more using AM. Moreover, due to the necessity of rastering the laser beam, the maximum part size can be limited. Presently a 25 cm×25 cm area part size is the largest part size that can be made with an AM technique that involves rastering the laser beam. Accordingly, there is a strong desire to reduce the time required to manufacture objects, and particularly metal objects, using AM. One important challenge that the present disclosure addresses is overcoming this relatively slow speed necessitated by the raster scanning operation employed with a conventional AM fabrication process.

SUMMARY

In one aspect the present disclosure relates to a system for performing an Additive Manufacturing (AM) fabrication process on a powdered material, deposited as a powder bed and forming a substrate. The system may comprise a laser for generating a laser beam. An optical subsystem may be included which is configured to receive the laser beam and to generate an optical signal comprised of electromagnetic radiation sufficient to melt or sinter the powdered material. The optical subsystem may include a digitally controlled mask configured to pattern the optical signal as needed to melt select portions of a layer of the powdered material to form a layer of a 3D part. A power supply and at least one processor may also be included. The processor may be configured to control the power supply to generate a plurality of different power density levels. A specific one of the different power density levels may be selectable based on a specific material composition of the powdered material, a known absorptivity of the powdered material, a known diameter of particles making up the powdered material, and a known thickness of the powder bed. The powdered material is used to form the 3D part in a sequential layer-by-layer process.

In another aspect the present disclosure relates to an apparatus for performing an Additive Manufacturing (AM) fabrication process on a powdered material forming a substrate. The apparatus may comprise a base plate for supporting a layer of the powdered material thereon. A laser source may be included for generating a pulsed laser beam providing electromagnetic radiation made up of a plurality of laser beams arranged in a 2D grid. An optical subsystem may be included which includes a 2D mask for shaping the laser beams into a 2D pattern directed at the powdered material. The laser source is able to generate the electromagnetic radiation with a duty cycle producing an average power density level sufficient to melt the powdered material. At least one processor may be included which controls a power density level of the laser beams, taking into account a plurality of variables including a composition of the powdered material, an absorptivity of the powdered material, a dimension of particles making up the powdered material, a thickness of the powdered layer, a thickness of a base plate on which the powdered layer is deposited, and a temperature of the base plate. The optical subsystem uses the 2D pattern generated by the 2D mask to selectively sinter at least desired portions of a layer of the powdered material simultaneously, and the at least one processor and the optical subsystem further operate to sinter new quantities of powdered material, in a sequential layer-by-layer sequence of operations, to form an additively manufactured part.

In still another aspect a method is disclosed for performing an Additive Manufacturing (AM) fabrication process on a powdered material deposited as a powder bed and forming a substrate. The method may comprise generating a laser beam to produce an optical signal comprised of electromagnetic radiation sufficient to melt or sinter the powdered material. The laser beam may be controlled to generate a plurality of different power density levels. A specific one of the power density levels may be selectable based on a specific material composition of the powdered material forming the powder bed, a known absorptivity of the powdered material, a known diameter of particles making up the powdered material, and a known thickness of the powder bed. The method may further include using an optical subsystem having a digitally controlled mask to pattern the optical signal in a 2D pattern needed to melt select portions of a layer of the powdered material to form a corresponding layer of a 3D part. The method may further include dynamically modifying the 2D pattern, for each new layer of powdered material melted by the optical signal, and further modifying a power density level of the optical signal when needed, to manufacture the 3D part in a sequential, layer-by-layer additive manufacturing process.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. In the drawings.

DETAILED DESCRIPTION

Figure 1:
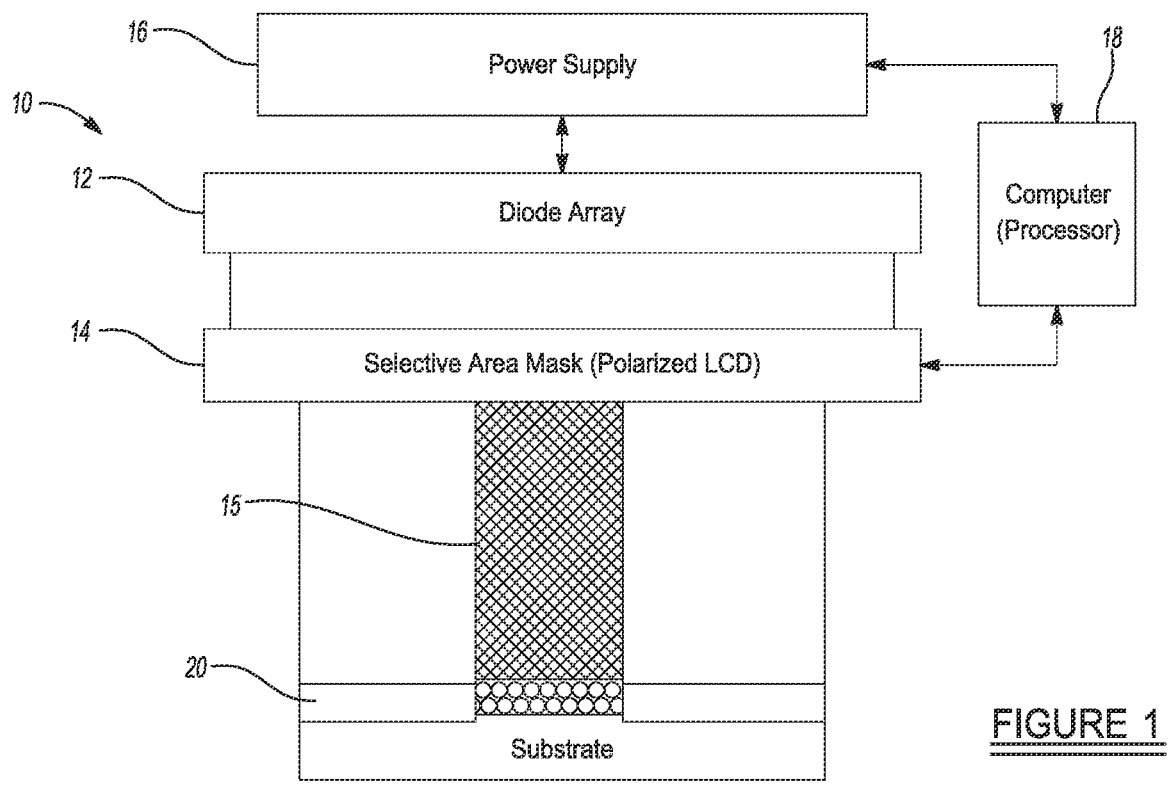
FIG. 1 is a diagrammatic view of one embodiment of the present system and method for performing an Additive Manufacturing ("AM") fabrication process using a high power diode array and a mask.

The following description is merely exemplary in nature and is not intended to limit the present disclosure, application, or uses. It should be understood that throughout the drawings, corresponding reference numerals indicate like or corresponding parts and features.

Referring to FIG. 1 a system 10 is shown in accordance with one embodiment of the present disclosure for performing an Additive Manufacturing ("AM") fabrication process. The system 10 may include a high power diode array 12 and a computer controlled, selective area mask 14 (hereinafter simply "mask 14"). A suitable power supply 16 may be used for providing electrical power to the diode array 12. A computer 18 or other suitable form of processor or controller may be used for controlling the power supply 16 to control the on/off application of power to the diode array 12 as well as selectively (i.e., digitally) controlling the mask 14 and shaping or focusing the optical beam. Optionally, separate processors or computers may be used to control the diode array 12 and the mask 14. Selectively electronically controlling the mask 14 with the computer 18 allows the optical beam from the diode array 12 to be prevented from reaching specific selected portions of powder that forms a substrate 20 (i.e., powder bed) so that those portions are irradiated by the beam. In FIG. 1 portion 15 is cross hatched to represent a portion of the output from the diode array 12 that does not reach the powdered material of the substrate 20.

Figures 3, 4:
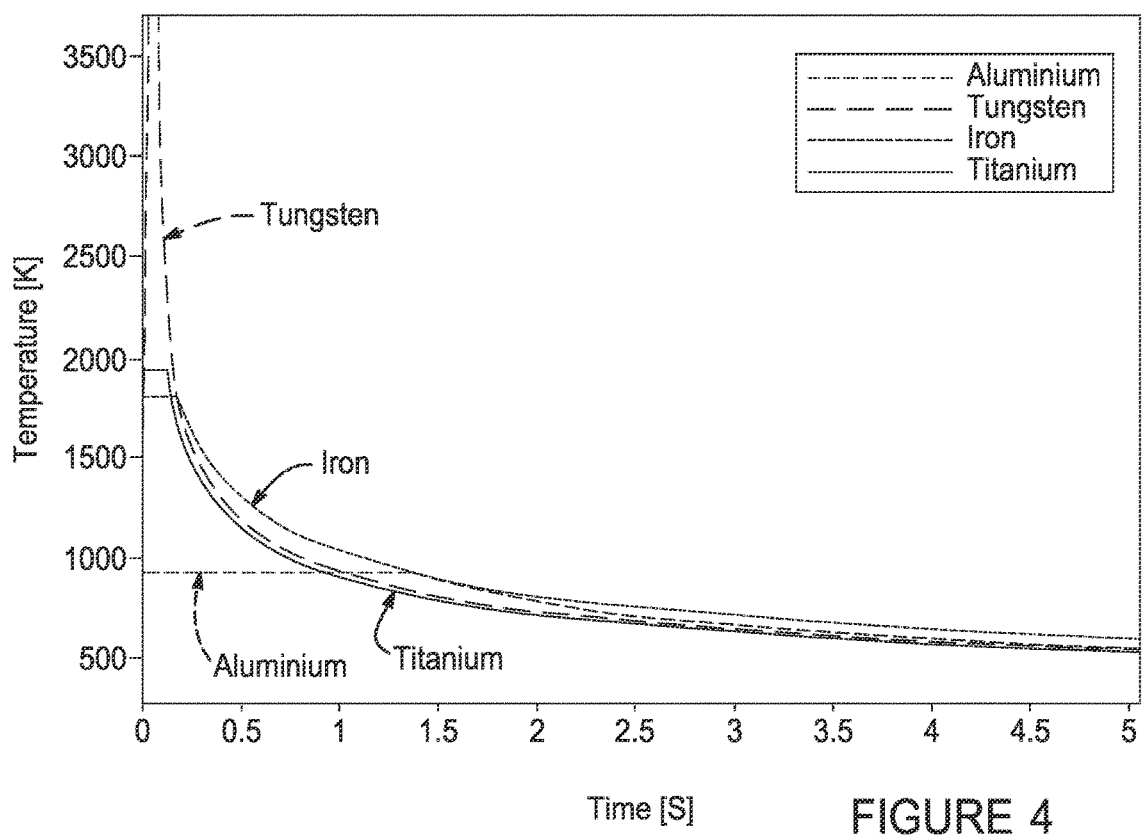
FIG. 3 is a chart illustrating the average power flux required to melt various types of metals.
FIG. 4 is a graph that shows a plurality of curves representing various temperatures required to melt various materials, along with the time required to melt each material.

In one preferred form the diode array 12 may comprise a single large diode bar. Alternatively, a plurality of diode bars located adjacent one another may be used to form the diode array 12. In one preferred form the diode array may be made up of arrays of diode bars each being about 1 cm×0.015 cm to construct a 25 cm×25 cm diode array. However, any number of diode bars may be used, and the precise number and configuration may depend on the part being constructed as well as other factors. Suitable diode bars for forming the diode array 12 are available from Lasertel of Tucson, AZ, Oclaro Inc. of San Jose, CA, nLight Corp. of Vancouver, WA, Quantel Inc. of New York, NY, DILAS Diode Laser, Inc. of Tucson, AZ, and Jenoptik AG of Jena, Germany, as well as many others. The diode array 12 is able to provide a minimum power density of about 10 kW/cm$^2$ and maximum >100 kW/cm$^2$ at two percent duty cycle. This makes it feasible to generate sufficient optical power to melt a wide variety of materials. FIG. 3 provides a table of the average power flux that has been calculated to melt various types of materials. FIG. 4 shows a graph that illustrates the effectiveness of the diode array 12 on a variety of metal powders (i.e., Aluminum, Titanium, Iron and Tungsten), at a power flux sufficient to melt all the materials. The calculations to obtain the graphs shown in FIG. 4 were performed in MATLAB with conductive and radiative losses taken into account. A conservative 30% absorptivity was assumed along with a powder layer thickness of 100 μm.

It will also be appreciated that a significant advantage of using a diode array comprised of one or more diode bars is that such an assembly is readily scalable. Thus, diode arrays of various sizes can be constructed to meet the needs of making a specific sized part. For example, the diode array 12 may be constructed to have a one square meter area, which would allow correspondingly large scale components to be constructed through an AM fabrication process, provided of course that a suitably sized powder bed is available to support fabrication of the part. Another significant advantage is that the system 10 can be integrated into existing AM fabrication systems with the added benefit of no moving parts. The system 10 allows for the AM fabrication of traditionally difficult to fabricate and join metal such as ODS (oxide dispersion strengthened) steels or any alloy traditionally formed using solid state (i.e., non-melt) processing techniques.

Figure 2:
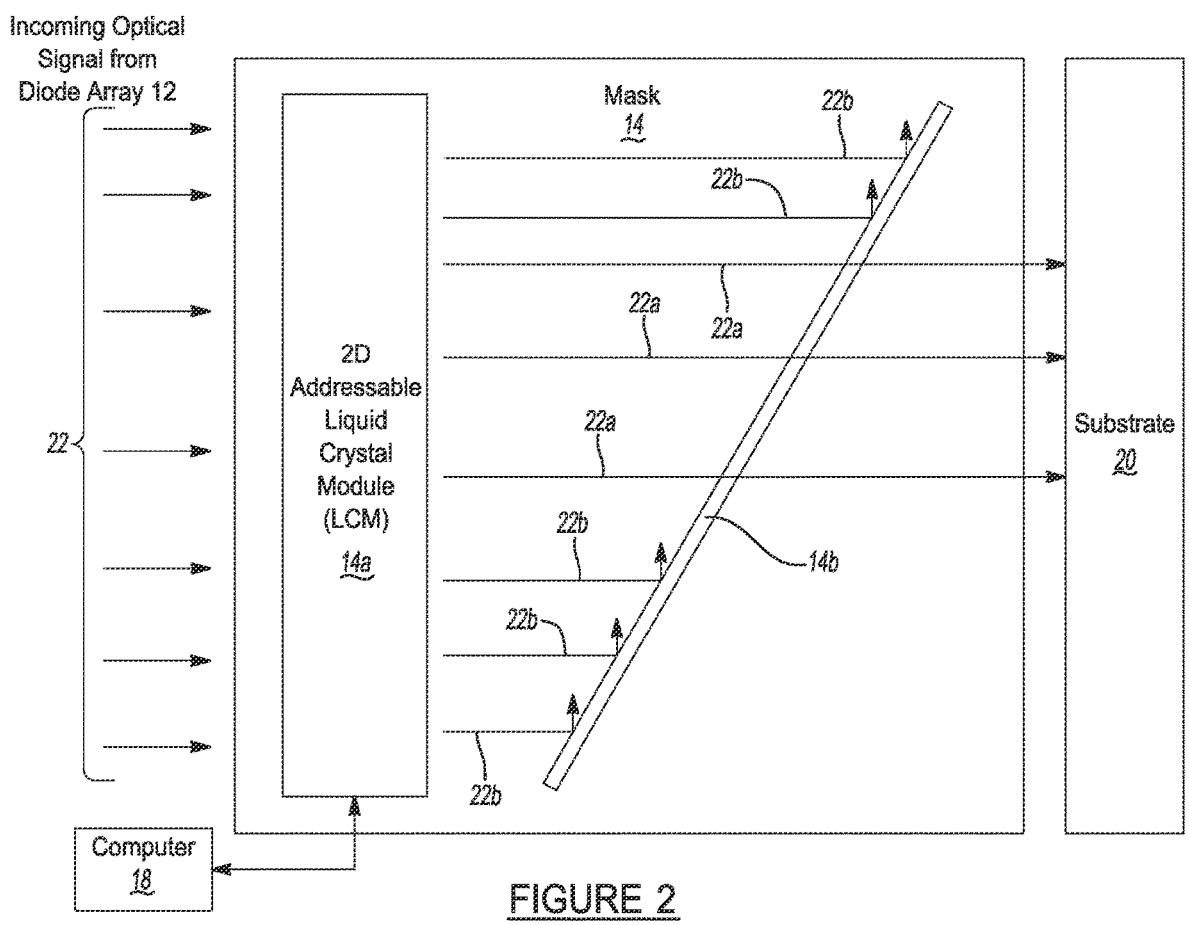
FIG. 2 is a diagrammatic side view of the system of FIG. 1 showing how a portion of the optical rays from the diode array are reflected by a polarizing mirror during the fabrication process to prevent them from reaching the substrate.

Referring to FIG. 2, in one preferred form the mask 14 forms a "liquid crystal polarization rotator" comprised of a liquid crystal module (LCM) 14a and a polarizing mirror 14b, in this example a polarizing mirror (hereinafter "polarizing mirror" 14b). The polarizing mirror 14b directs the light defined by the liquid crystal polarization rotator and shapes the optical pattern that irradiates the substrate 20. The LCM 14a that helps to form the mask 14 may be made up of one or more two dimensional, electronically (i.e., digitally) addressable arrays of pixels. Liquid crystal polarizers are commercially available and form two dimensional arrays of addressable pixels which work by changing the polarity of an incoming photon that is then rejected by a polarization element. However, with the system 10, the polarizing mirror 14b may form a discrete component of the mask 14 that may be used to help focus and/or shape the optical signal.

In FIG. 2 the mask 14 receives light 22 being output from the diode array 12 as the light irradiates the LCM 14a. Pixels of the LCM 14a are independently addressed using the computer 18 to reject light at specific select areas of the substrate 20. Using the LCM 14a and the polarizing mirror 14b to form the mask 14 enables the light generated by the diode array 12 to be controllably directed onto only selected areas of the substrate 20 as needed. In FIG. 2 light indicated by lines 22a is able to pass through the polarizing mirror 14b while light indicated by lines 22b is rejected by the polarizing mirror. An important advantage of using a computer controlled LCM 14a is that only a very small amount of optical energy is absorbed into the polarizing mirror 14b, thus making it feasible to prevent damage to the mirror.

During an actual AM fabrication operation, a first layer of powdered material may be acted on by the system by pulsing the diode array 12 to melt selected portions (or possibly the entire portion) of the first layer. A subsequent (i.e., second) layer of powdered material may then be added over the layer just acted on by the system 10 and the process would be repeated. The diode array 12 may be pulsed to melt one or more selected subportions (or possibly the entirety) of the second layer of material. With each layer the system 10 electronically controls the pixels of the mask 14 to selectively block specific, predetermined portions of the substrate 20 from being irradiated by the pulsed optical signal from the diode array 12. This process is repeated for each layer, with the computer 18 controlling the mask 14 so that, for each layer, one or more selected subportions (or possibly the entirety) of the powdered material is blocked by the mask 14 from being exposed to the pulsed optical signal. Preferably, an entire two-dimensional area of each layer is melted or sintered at once by pulsing the diode array 12. However, it is just as feasible to raster scan the diode array 12 over the two-dimensional area in the event the entire two dimensional area cannot be completely irradiated by the diode array.

An alternative to the addressable mask 14 is a non-addressable mask. A non-addressable mask may be a precision cut piece of metal (e.g., tungsten) that would simply block portions of the light beam. While such a machined mask can be used to build simple geometries, the full potential of the system 10 described herein will be maximized if an addressable mask such as mask 14 is used.

Figure 5:
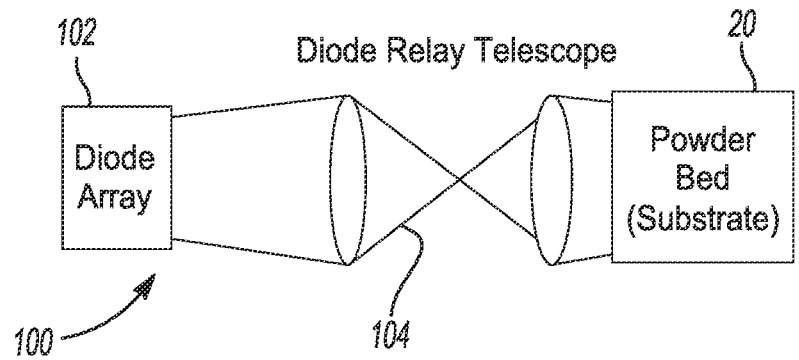
FIG. 5 shows an alternative form of the system of the present disclosure in which distinct "tiles" (predetermined areas) corresponding to pixels of the substrate are digitally controlled during the AM fabrication process.
Figure 6:
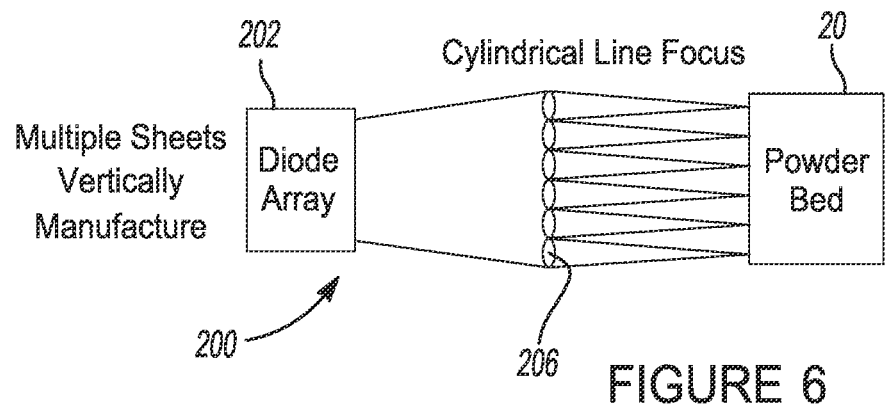
FIG. 6 is another alternative form of the system of the present disclosure in which a plurality of focusing lenses are used to simultaneously focus the output from the diode array onto specific sections of the substrate for simultaneously melting distinct, separate sheets of material.

Referring to FIGS. 5 and 6, two alternative systems 100 and 200 in accordance with additional implementations of the present disclosure are shown. System 100 includes a diode array 102 and a diode relay telescope 104. The diode relay telescope 104 is used to provide digital control over "tiles" within an array image to the "pixels" in the substrate 20 (powder bed). FIG. 6 illustrates a system 200 having a diode array 202 and a plurality of focusing lenses 206 that are used to focus the optical energy from the array onto a corresponding plurality of "sheets" representing the substrate 20.

The systems 10, 100 and 200 are able to melt and sinter each layer in a single "pass" or, put differently, in a single operation by pulsing the diode array 12. The need to raster scan an optical beam dozens, hundreds or more times, back and forth across a surface, is therefore eliminated. This significantly reduces the time required to melt and sinter each layer of powder material during the AM fabrication process.

Figure 7:
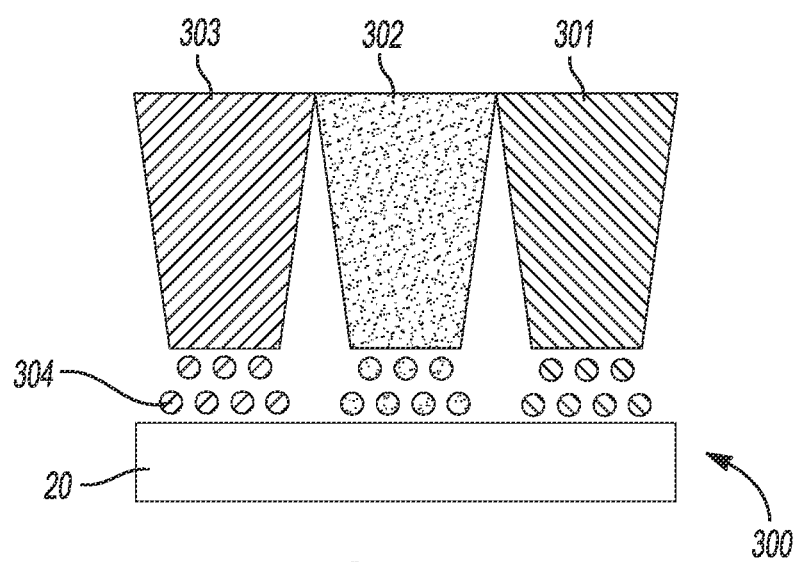
FIG. 7 is a diagrammatic side view of a method of deposition of different material types in powder form prior to illumination by diode array generated light to melt/sinter the dissimilar powders together.

Referring to FIG. 7, a method of deposition of different material types in powder form is illustrated in system 300. Nozzles 301, 302, and 303 are capable of depositing layers of different material powders 304 onto the substrate 20. The nozzle heads 301, 302 and 303 are rastered across the part surface covering it with material addressed by a programmable source. Both the irradiation from the diode array 12 and operation of the mask 14, as described in connection with the system 10, can be controlled such that each material deposited from the nozzles 301, 302 and 303 receives the correct amount of optical energy for a controlled melt or sintering.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for performing an Additive Manufacturing (AM) fabrication process on a powdered material, deposited as a powder bed and forming a substrate, the system comprising:
   a laser for generating a laser beam;
   an optical subsystem configured to receive the laser beam and to generate an optical signal comprised of electromagnetic radiation sufficient to melt or sinter the powdered material;
   the optical subsystem including a digitally controlled mask configured to pattern the optical signal as needed to melt select portions of a layer of the powdered material to form a layer of a 3D part;
   a power supply; and
   at least one processor for controlling the power supply to generate a plurality of different power density levels, with a specific one of said different power density levels being selectable based on a specific material composition of the powdered material, a known absorptivity of the powdered material, a known diameter of particles making up the powdered material, and a known thickness of the powder bed, and where the powdered material is used to form the 3D part in a sequential layer-by-layer process; and
   an additional optical subsystem arranged upstream of the powdered material, and downstream of the first optical subsystem, relative to a direction of travel of the optical signal, the second optical subsystem being configured to receive the optical signal from the first optical subsystem and to provide control over the optical signal to help facilitate melting of the powdered material, where the additional optical subsystem comprises a relay telescope.

2. The system of claim 1, wherein the digitally controlled mask comprises a liquid crystal polarization rotator having a liquid crystal module and a polarizer, the digitally controlled mask configured to generate the optical signal by receiving and rotating a first portion of the laser beam and passing the first portion therethrough to form the optical signal, while rejecting a second portion of the laser beam, to thus pattern the optical signal.

3. The system of claim 1, where the additional optical subsystem generates the optical signal with a shape formed as a line focus.

4. The system of claim 1, wherein the laser comprises a diode laser.

5. The system of claim 4, wherein the diode laser is pulsed with a predetermined duty cycle to provide a predetermined minimum power density calculated to melt the powdered material.

6. The system of claim 4, where the diode laser includes the power supply.

7. The system of claim 4, where the diode laser comprises an array of diode lasers including one or more bars of diode lasers.

8. The system of claim 7, wherein the output of the one or more bars of diode lasers forms a 2D array of laser beams.

9. The system of claim 8, where the 2D array of laser beams produces a 2D array of lines, where each said line is formed using at least one of the diode lasers.

10. The system of claim 9, where the output of the optical subsystem is a 2D image.

11. The system of claim 10, wherein:
the 2D image from the first optical subsystem is relayed to the powder bed by the optics subsystem as a full 2D image, such that the full 2D image is incident on the powdered material and the specific one of the power density levels is tuned to melt the powdered material in a pattern corresponding to the full 2D image.

12. The system of claim 1, where a full 2D image from the optical subsystem is relayed to the powder bed by the relay telescope such that the full 2D image is incident on the powdered material, and the power density level is tuned to melt the powdered material in a pattern corresponding to the full 2D image.

13. The system of claim 1, wherein the digitally controlled mask comprises a dynamic, digitally controlled 2D mask.

14. An apparatus for performing an Additive Manufacturing (AM) fabrication process on a powdered material forming a substrate, the apparatus comprising:
a base plate for supporting a layer of the powdered material thereon;
a laser source for generating a pulsed laser beam providing electromagnetic radiation made up of a plurality of laser beams arranged in a 2D grid;
an optical subsystem including a 2D mask for shaping the laser beams into a 2D pattern directed at the powdered material;
the laser source being able to generate the electromagnetic radiation with a duty cycle producing an average power density level sufficient to melt the powdered material;
at least one processor which controls a power density level of the laser beams, taking into account a composition of the powdered material, an absorptivity of the powdered material, a dimension of particles making up the powdered material, a thickness of the powdered layer, a thickness of a base plate on which the powdered layer is deposited, and a temperature of the base plate;
the optical subsystem using the 2D pattern generated by the 2D mask to selectively sinter at least desired portions of a layer of the powdered material simultaneously; and
the at least one processor and the optical subsystem operating to sinter new quantities of powdered material, in a sequential layer-by-layer sequence of operations, to form an additively manufactured part.

\* \* \* \* \*